E. SMITH.
Scroll-Sawing Machine.

No. 167,794. Patented Sept. 14, 1875.

Witnesses
Saml. J. Van Stavoren
Jos. B. Connolly

Inventor
Eugene Smith
By Connolly Bros., Attorneys

UNITED STATES PATENT OFFICE.

EUGENE SMITH, OF PHILADELPHIA, PENNSYLVANIA.

IMPROVEMENT IN SCROLL-SAWING MACHINES.

Specification forming part of Letters Patent No. 167,794, dated September 14, 1875; application filed July 27, 1875.

*To all whom it may concern:*

Be it known that I, EUGENE SMITH, of Philadelphia, in the county of Philadelphia and State of Pennsylvania, have invented certain new and useful Improvements in Scroll-Sawing Machines; and I do hereby declare the following to be a full, clear, and exact description of the invention, such as will enable others skilled in the art to which it pertains to make and use it, reference being had to the accompanying drawings, which form part of this specification, in which—

Figure 1:
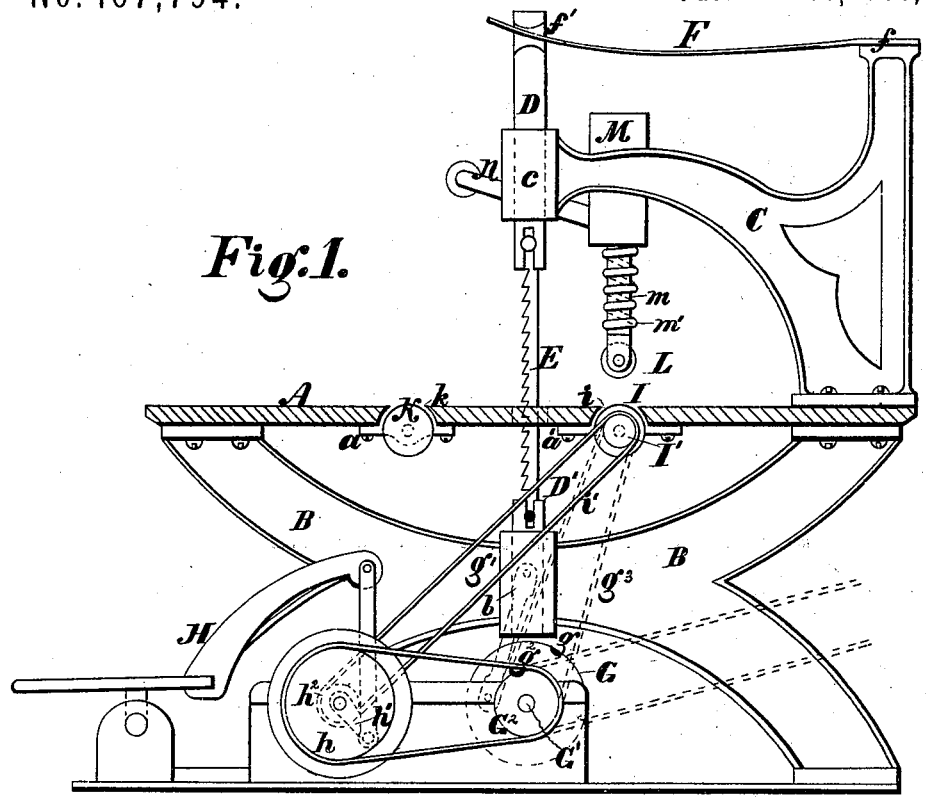
Figures 2, 3:
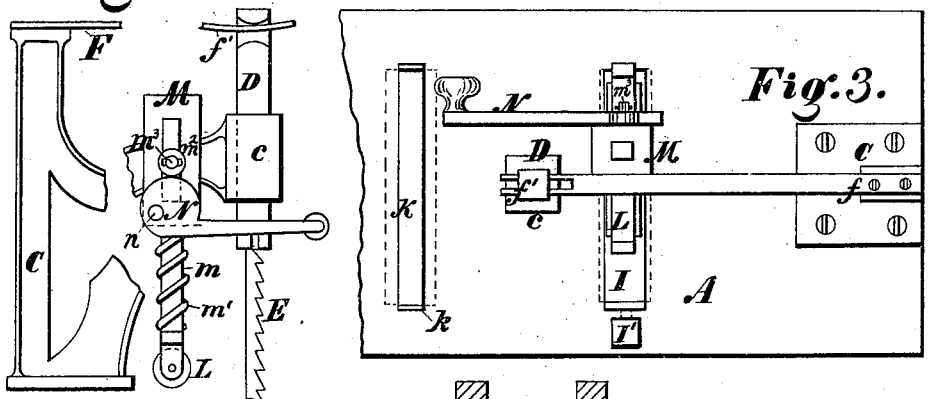
Figure 4:
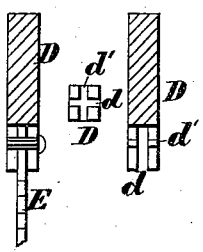

Figure 1 is a longitudinal vertical section. Fig. 2 is a front elevation of the presser-roller. Fig. 3 is a broken plan; Fig. 4, detail views.

My invention has reference to the peculiar construction and combination of parts, hereinafter fully described.

A in the accompanying drawing shows the table mounted on a frame or legs, B. C is an arm secured to the table, and sustaining, at its outer extremity, a guide-post, $c$, in which works the upper guide-rod D, the lower guide-rod D′ working in a similar post, $b$, in the frame B. Both guide-rods have two right-angled slots or kerfs, $d$ $d'$, permitting the saw E to be set so as to work stuff moved either longitudinally or transversely of the table A. F is a spring, secured at $f$ to the arm C, and engaging at $f'$ with the guide-rod D, so as to cause the vertical upward motion of the saw. Motion is communicated to the saw by means of the pitman $g$, secured at $g^1$ to the guide-rod D′, and at $g^2$ to the crank-arm on the disk G, the latter being fast on a shaft, $G^1$. This shaft may be run direct by steam by a belt-connection with its pulley $G^2$, or by a belt running to said pulley from the pulley $h$ on the crank-shaft $h^1$ of the treadle H.

For ordinary work the treadle-connection may be employed. When greater speed is desired the treadle-belt may be shifted, and the steam-belt brought into requisition. The pulleys $G^2$ and $h$ are designed to be cone-pulleys, so as to vary their relative speed.

I and K are feed-rollers working in slots or openings $i$ $k$ in the table A, being sustained in bearings $a$ $a'$ beneath said table. The upper surfaces or peripheries of these rollers are slightly above the surface of the table, so as to present anti-friction bearings for the stuff being worked. The roller I is provided with a fast pulley, I′, run by a belt, $i'$, from the pulley $h^2$ on the crank-shaft $h^1$, when the treadle is used, or by a belt, $g^3$, from the shaft $G^1$, when steam is employed. This gives the required motion to the feed-roller I, the roller K rotating by the traction of the stuff working over and upon it. L represents a pressure-roller sustained in bearings attached to a rod, $m$, which slides vertically in a post, M, secured to the arm C. Said roller is pressed down by a spiral spring, $m^1$, and may be raised, when required, by a cam-lever, N, pivoted at $n$, and working against an anti-friction roller, $m^2$, sustained on a short shaft, $m^3$, on the rod $m$.

What I claim as my invention is—

The pressure-roller L, held down by the spring $m^1$, in combination with the cam-lever N, for raising it when required, substantially as set forth.

In testimony that I claim the foregoing I have hereunto set my hand this 22d day of July, 1875.

EUGENE SMITH.

Witnesses:
M. DANL. CONNOLLY,
CHARLES F. VAN HORN.